(12) United States Patent
Liu et al.

(10) Patent No.: US 12,593,257 B2
(45) Date of Patent: Mar. 31, 2026

(54) COMMUNICATION METHOD AND DEVICE AND STORAGE MEDIUM

(71) Applicant: ZTE CORPORATION, Shenzhen (CN)

(72) Inventors: Zhuang Liu, Shenzhen (CN); Yin Gao, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 288 days.

(21) Appl. No.: 18/555,784

(22) PCT Filed: Jun. 2, 2022

(86) PCT No.: PCT/CN2022/096913
§ 371 (c)(1),
(2) Date: Oct. 17, 2023

(87) PCT Pub. No.: WO2023/010987
PCT Pub. Date: Feb. 9, 2023

(65) Prior Publication Data
US 2024/0214892 A1     Jun. 27, 2024

(30) Foreign Application Priority Data
Aug. 4, 2021     (CN) .......................... 202110893124.7

(51) Int. Cl.
*H04W 36/08*     (2009.01)
*H04W 36/38*     (2009.01)
*H04W 68/02*     (2009.01)

(52) U.S. Cl.
CPC ........... *H04W 36/08* (2013.01); *H04W 36/38* (2013.01); *H04W 68/02* (2013.01)

(58) Field of Classification Search
CPC ..... H04W 36/08; H04W 36/38; H04W 68/02; H04W 36/008355; H04W 68/00; H04W 76/27; H04W 76/28; H04W 88/085
See application file for complete search history.

(56) References Cited

U.S. PATENT DOCUMENTS

| | | | |
|---|---|---|---|
| 2017/0230935 A1 | 8/2017 | Xu et al. | |
| 2019/0223152 A1 | 7/2019 | Ke et al. | |

(Continued)

FOREIGN PATENT DOCUMENTS

| | | | | |
|---|---|---|---|---|
| CN | 109392094 A | * | 2/2019 | ............ H04W 68/02 |
| CN | 110536331 A | | 12/2019 | |
| WO | 2023/285467 A1 | | 1/2023 | |

OTHER PUBLICATIONS

Extended European Search Report in Application No. 22851703.3, dated Mar. 5, 2025, 16 pages.

(Continued)

*Primary Examiner* — Christopher M Brandt
(74) *Attorney, Agent, or Firm* — Morgan, Lewis & Bockius LLP

(57)     ABSTRACT

Provided are a communication method and device and a storage medium. A communication method applied to a first network element includes determining a target cell according to the received new radio (NR) light assistance information; and handing a first communication node over to the target cell or paging the first communication node in the target cell.

20 Claims, 8 Drawing Sheets

Determine a target cell according to received NR light assistance information     S110

Hand over a first communication node to the target cell or page the first communication node in the target cell     S120

(56)                References Cited

U.S. PATENT DOCUMENTS

| 2019/0342804 A1 | 11/2019 | Futaki et al. | |
| 2023/0038753 A1* | 2/2023 | Tan ................... | H04W 74/0833 |
| 2023/0232314 A1* | 7/2023 | Koskinen .............. | H04W 48/12 |
| | | | 370/311 |
| 2024/0187990 A1* | 6/2024 | Chen ..................... | H04W 76/28 |
| 2024/0334461 A1* | 10/2024 | Lyazidi ............. | H04W 52/0216 |

OTHER PUBLICATIONS

3GPP, "Technical Specification Group Radio Access Network;
Study on support of reduced capability NR devices (Release 17)",
vol. RAN WG1, No. V17.0.0, Mar. 30, 2021, pp. 1-135, XP052000314,
Retrieved from the Internet: URL:https://ftp.3gpp.org/Specs/archive/
38_series/38.875/38875-h00.zip.
International Search Report in Application No. PCT/CN2022/
096913, dated Aug. 31, 2022, 4 pages, including translation.
Office Action in Japanese Application No. 2023-561361, dated Aug.
20, 2024, 8 pages, including translation.
Huawei, "Summary of offline 107—[RedCap] L2 capabilities and
UE types", 3GPP TSG-RAN WG2 Meeting#113-e, R2-2102017,
Online, Jan. 25-Feb. 5, 2021.
Qualcomm Incorporated, "Access and camping restriction for RedCap
UEs", 3GPP TSG-RAN WG2 Meeting #114-e, R2-2104775, Online,
May 19-27, 2021.
Huawei et al., "Definition of RedCap UE type and reduced capa-
bilities", 3GPP TSG-RAN WG2 #114-e, R2-2105634, Electronic,
May 19-27, 2021.

* cited by examiner

Determine a target cell according to received NR light assistance information    S110

Hand over a first communication node to the target cell or page the first communication node in the target cell    S120

FIG. 1

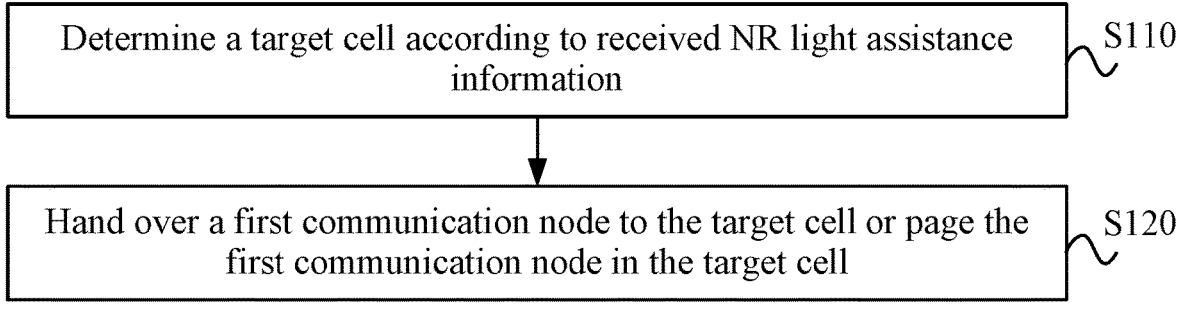

Send NR light assistance information to a first network element, where the NR light assistance information is configured to enable a network element to determine a target cell to hand over a first communication node to the target cell or to page the first communication node in the target cell; and the second network element and the first network element belong to the same second communication node    S210

FIG. 2

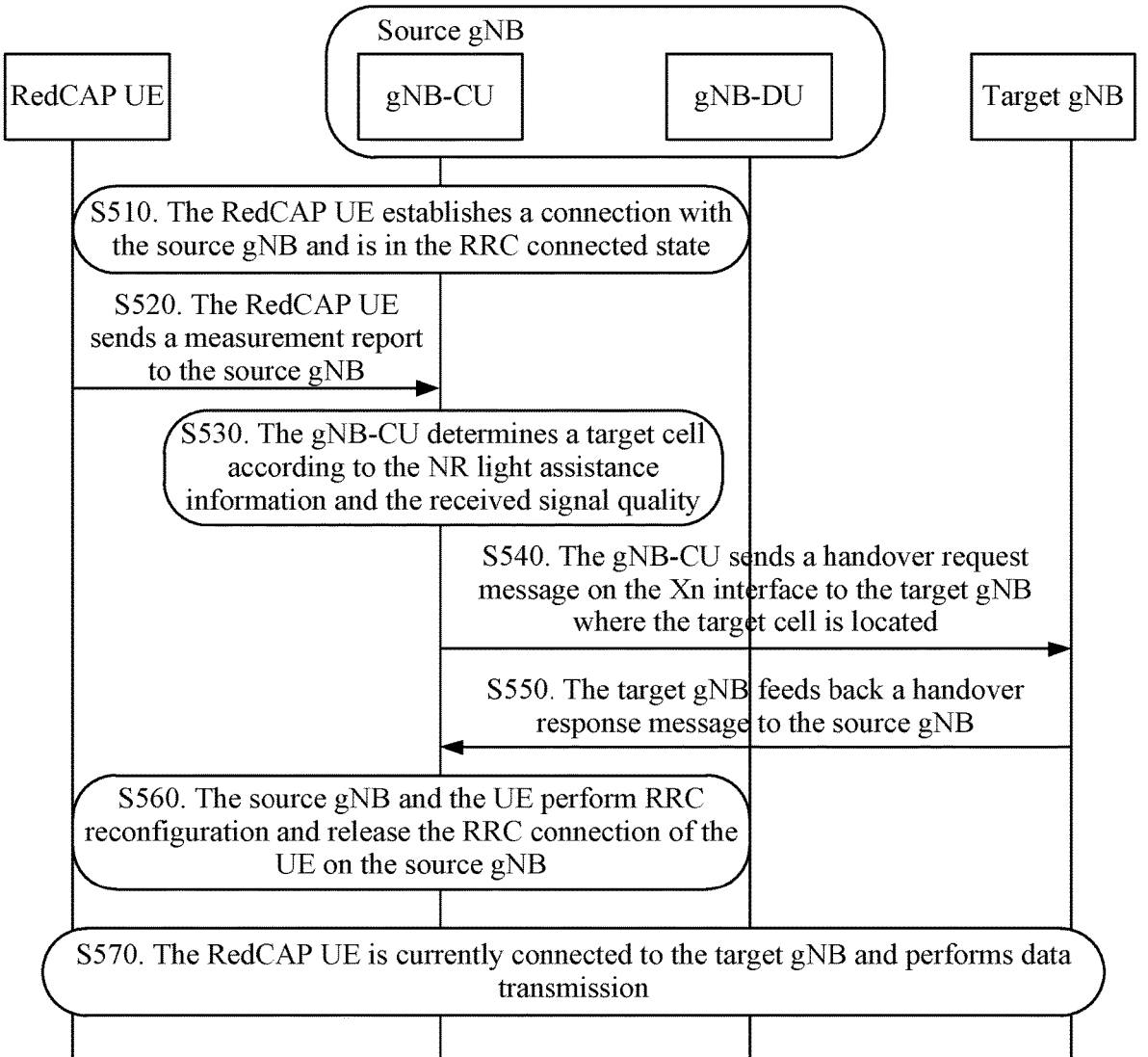

S510. The RedCAP UE establishes a connection with the source gNB and is in the RRC connected state S520. The RedCAP UE sends a measurement report to the source gNB S530. The gNB-CU determines a target cell according to the NR light assistance information and the received signal quality S540. The gNB-CU sends a handover request message on the Xn interface to the target gNB where the target cell is located S550. The target gNB feeds back a handover response message to the source gNB S560. The source gNB and the UE perform RRC reconfiguration and release the RRC connection of the UE on the source gNB S570. The RedCAP UE is currently connected to the target gNB and performs data transmission

FIG. 5

COMMUNICATION METHOD AND DEVICE AND STORAGE MEDIUM

CROSS-REFERENCE TO RELATED APPLICATIONS

This is a National Stage Application, filed under 35 U.S.C. 371, of International Patent Application No. PCT/CN2022/096913, filed on Jun. 2, 2022, which claims priority to a Chinese patent application No. 202110893124.7 filed on Aug. 4, 2021, the disclosures of which are incorporated herein by reference in their entireties.

TECHNICAL FIELD

The present application relates to the field of communications and, in particular, a communication method and device and a storage medium.

BACKGROUND

In a fifth-generation (5G) network, during the movement of a new radio (NR) light reduced capability (RedCAP) user equipment (UE)/devices, a 5G base station cannot select an appropriate target cell to which the RedCAP UE is handed over, or the 5G base station cannot determine an appropriate target cell for paging the UE.

SUMMARY

In view of this, embodiments of the present application provide a communication method and device and a storage medium, so as to achieve the purpose of selecting an appropriate target cell to which a first communication node is handed over or determining an appropriate target cell in which the first communication node is paged in the 5G network.

An embodiment of the present application provides a communication method. The method is applied to a first network element and includes the following.

A target cell is determined according to received NR light assistance information.

A first communication node is handed over to the target cell or the first communication node is paged in the target cell.

An embodiment of the present application provides a communication method. The method is applied to a second network element and includes the following.

NR light assistance information is sent to a first network element, where the NR light assistance information is used for enabling a network element to determine a target cell to hand over a first communication node to the target cell or to page the first communication node in the target cell; and the second network element and the first network element belong to the same second communication node.

An embodiment of the present application provides a communication apparatus. The apparatus is applied to a first network element and includes a first determination module and a communication module.

The first communication module is configured to determine a target cell according to received NR light assistance information.

The communication module is configured to hand over a first communication node to the target cell or page the first communication node in the target cell.

An embodiment of the present application provides a communication apparatus. The apparatus is applied to a second network element and includes a first transmitter.

The first transmitter is configured to send NR light assistance information to a first network element, where the NR light assistance information is configured to enable a network element to determine a target cell to hand over a first communication node to the target cell or to page the first communication node in the target cell; and the second network element and the first network element belong to the same second communication node.

An embodiment of the present application provides a communication device. The device includes a communication module, a memory, and one or more processors.

The communication module is configured to perform a communication interaction between a first network element, a second network element, a first communication node, a second communication node, a third communication node, and a core network.

The memory is configured to store one or more programs.

The one or more programs, when executed by the one or more processors, cause the one or more processors to perform the method according to any of the preceding embodiments.

An embodiment of the present application provides a storage medium for storing a computer program which, when executed by a processor, causes the processor to perform the method according to any of the preceding embodiments.

BRIEF DESCRIPTION OF DRAWINGS

FIG. 1 is a flowchart of a communication method according to an embodiment of the present application;

FIG. 2 is a flowchart of another communication method according to an embodiment of the present application;

FIG. 5 is a schematic diagram illustrating the interaction of base station handover based on NR light assistance information according to an embodiment of the present application;

DETAILED DESCRIPTION

Figure 3:
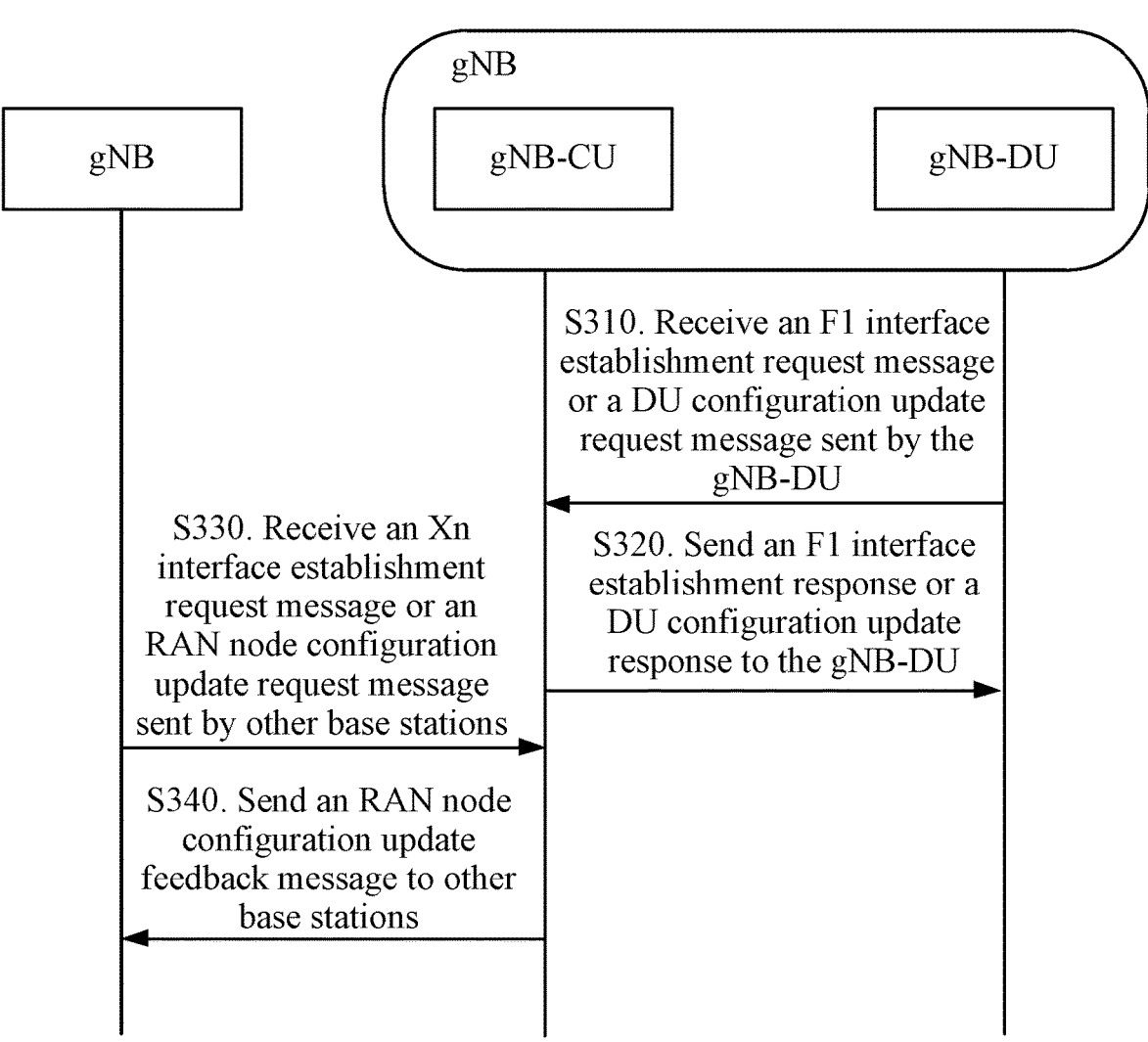
FIG. 3 is a schematic diagram illustrating the interaction of NR light assistance information between base stations according to an embodiment of the present application.

Embodiments of the present application are described hereinafter in conjunction with drawings. The present application is described hereinafter in conjunction with the embodiments and the drawings. The examples listed hereinafter are merely intended to explain the present application and not to limit the scope of the present application.

NR light is introduced into the 5G. The performance and cost of NR light are between the eMTC/NB-IoT and the NR enhanced mobile broadband (eMBB)/ultra-reliable low-latency communications (URLLC). NR light only occupies 10 MHz or 20 MHz bandwidth and supports a downlink rate of 100 Mbps and an uplink rate of 50 Mbps. NR light is used in the scenarios such as the industrial IoT sensors, the surveillance cameras, and the wearable devices. For the RedCAP UE/devices supporting NR light, the UE cost and complexity need to be reduced, the UE bandwidth needs to be reduced, the UE antennas need to be reduced, the baseband complexity needs to be reduced, the UE power level needs to be reduced, and the like.

NR light is introduced into the 5G. The performance and cost of NR light are between the eMTC/NB-IoT and the NR enhanced mobile broadband (eMBB)/ultra-reliable low-latency communications (URLLC). NR light only occupies 10 MHz or 20 MHz bandwidth and supports a downlink rate of 100 Mbps and an uplink rate of 50 Mbps. NR light is used in the scenarios such as the industrial IoT sensors, the surveillance cameras, and the wearable devices. For the RedCAP UE/devices supporting NR light, the UE cost and complexity need to be reduced, the UE bandwidth needs to be reduced, the UE antennas need to be reduced, the UE cost and complexity need to be reduced, the baseband complexity needs to be reduced, the UE power level needs to be reduced, and the like.

A 5G UE may be in a radio resource control (RRC) idle state, an RRC inactive state, or an RRC connected state. For a RedCAP UE in the RRC connected state, when the RedCAP UE moves within the coverage of another base station, an appropriate target cell needs to be selected to which the RedCAP UE is handed over. For a RedCAP UE in the RRC idle state or the RRC inactive state, the UE may move to a different cell, and when service data arrives, the base station needs to select the target cell where the UE may be located to page the UE.

For a 5G base station reconstructed into independent network elements of distributed units (DUs) and a central unit (CU), the physical higher layer, media access control (MAC), and the radio link control (RLC) protocol layer that require high real-time performance are processed in the DUs, while the packet data convergence protocol (PDCP) and the RRC control plane without high real-time performance are processed in the CU. One base station generally includes one CU and several DUs, and each DU is connected to the CU through an F1 interface.

Currently, in the 5G network, during a movement of the NR light RedCAP UE in the connected state, the 5G base station cannot select an appropriate target cell for the Red-CAP UE to perform a handover, or during a movement of the RedCAP UE in an unconnected state, the 5G base station cannot determine an appropriate target cell for paging the UE.

In view of this, an embodiment of the present application provides a communication method, so as to achieve the purpose of selecting an appropriate target cell to which a first communication node is handed over or determining an appropriate target cell in which the first communication node is paged in the 5G network.

In an embodiment, FIG. 1 is a flowchart of a communication method according to an embodiment of the present application. This embodiment may be performed by a first network element. The first network element is the CU. As shown in FIG. 1, this embodiment includes S110 and S120.

In S110, a target cell is determined according to received NR light assistance information.

In S120, a first communication node is handed over to the target cell or the first communication node is paged in the target cell.

The first communication node refers to the RedCAP UE. In an embodiment, after the first network element receives the NR light assistance information, the first network element may determine the target cell capable of supporting the RedCAP UE according to the NR light assistance information so that the RedCAP UE currently in the connected state can be handed over to the target cell or the RedCAP UE currently in the inactive state or the idle state is paged. In an actual communication process, the target cell and the first network element may not belong to the same base station.

In an embodiment, the communication method applied to the first network element further includes, before the target cell is determined according to the received NR light assistance information, receiving the NR light assistance information sent by a second network element. The second network element and the first network element belong to the same second communication node.

Alternatively, before the target cell is determined according to the received NR light assistance information, the communication method further includes receiving the NR light assistance information sent by a third communication node. The second communication node and the third communication node belong to the same type of node.

Alternatively, before the target cell is determined according to the received NR light assistance information, the communication method further includes receiving the NR light assistance information sent by the second network element and the third communication node. Each of the second communication node and the third communication node may be a base station, that is, a gNB, but the second communication node and the third communication node do not belong to the same base station. In an embodiment, the NR light assistance information may be configured by the second network element or the third communication node. Correspondingly, the second network element may send the NR light assistance information to the first network element, and the third communication node may also send the NR light assistance information to the first network element; or both the second network element and the third communication node send the NR light assistance information to the first network element.

In an embodiment, the NR light assistance information includes support information of a cell for the first communication node.

The support information for the first communication node includes at least one of the following: whether the cell supports access of a RedCAP UE, whether the cell supports a RedCAP UE of one receiving branch, or whether the cell supports a RedCAP UE of two receiving branches.

In an embodiment, receiving the NR light assistance information sent by the second network element includes one of the following.

In a process of establishing a first interface between the first network element and the second network element, a first interface establishment request message sent by the second network element is received, where the first interface establishment request message includes the NR light assistance information of a cell configured by the second network element.

After the first interface is established, a second network element configuration update request message sent by the second network element is received, where the second network element configuration update request message includes the NR light assistance information of the cell configured by the second network element. In an embodiment, the first interface refers to an F1 interface between network elements.

In an embodiment, receiving the NR light assistance information sent by the third communication node includes one of the following.

In a process of establishing a second interface between the second communication node and the third communication node, a second interface establishment request message sent by the third communication node is received, where the second interface establishment request message includes the NR light assistance information of a cell configured by the second communication node.

After the second interface is established, a radio access network (RAN) node configuration update request message sent by the third communication node is received, where the RAN node configuration update request message includes the NR light assistance information of the cell configured by the second communication node. In an embodiment, the second interface refers to an Xn interface between base stations.

In an embodiment, determining the target cell according to the received NR light assistance information includes the following.

According to the received NR light assistance information, the target cell on a second network element is determined for the first communication node currently in the RRC connected state.

In an embodiment, determining the target cell according to the received NR light assistance information includes the following.

According to the received NR light assistance information, the target cell on a third communication node is determined for the first communication node currently in the RRC connected state.

In an embodiment, the communication method applied to the first network element further includes, after the target cell is determined according to the received NR light assistance information, initiating a UE text establishment request to the target cell on the first interface. The UE text establishment request carries at least one of the following: information indicating whether the first communication node is a RedCAP UE or the type of the first communication node.

In an embodiment, the communication method applied to the first network element further includes, after the target cell is determined according to the received NR light assistance information, initiating a handover request to the target cell on the second interface. The handover request carries at least one of the following: information indicating whether the first communication node is a RedCAP UE or the type of the first communication node. The type of the first communication node includes a RedCAP UE of one receiving branch and a RedCAP UE of two receiving branches.

In an embodiment, determining the target cell according to the received NR light assistance information includes the following.

According to the received NR light assistance information, the target cell on the second network element is determined for the first communication node currently in the RRC inactive state.

In an embodiment, determining the target cell according to the received NR light assistance information includes the following.

According to the received NR light assistance information, the target cell on the third communication node is determined for the first communication node currently in the RRC inactive state.

In an embodiment, the communication method applied to the first network element further includes, after the target cell on the second network element is determined, initiating a paging message to the second network element on the first interface. The paging message carries at least one of the following: an eDRX cycle or a paging time window (PTW).

In an embodiment, the communication method applied to the first network element further includes sending eDRX assistance information to a core network, where the eDRX assistance information includes at least one of the following: an eDRX cycle of the RRC inactive state or a PTW of the RRC inactive state.

In an embodiment, the communication method applied to the first network element further includes the following.

eDRX assistance information sent by the core network is received, where the eDRX assistance information includes at least one of the following: the maximum discontinuous reception (DRX) cycle allowed by eDRX of an inactive state, the minimum DRX cycle allowed by the eDRX of the inactive state, a DRX cycle range allowed by the eDRX of the inactive state, the maximum PTW length allowed by the eDRX of the inactive state, the minimum PTW length allowed by the eDRX of the inactive state, or a PTW length range allowed by the eDRX of the inactive state.

An eDRX parameter of the RRC inactive state is determined according to the eDRX assistance information.

In an embodiment, the communication method applied to the first network element further includes the following.

An initial UE message is sent to the core network. The initial UE message carries at least one of the following: the information indicating whether the first communication node is a RedCAP UE or the type of the first communication node. In an embodiment, the first network element sends the initial UE message to the core network, where the initial UE message is used for enabling the first communication node to access the target cell. In an embodiment, if the initial UE message includes the information indicating that the first communication node is the RedCAP UE, the first communication node may be accessed to the target cell.

In an embodiment, FIG. 2 is a flowchart of another communication method according to an embodiment of the present application. This embodiment may be performed by the second network element. The second network element is the DU. As shown in FIG. 2, this embodiment includes S210.

In S210, NR light assistance information is sent to a first network element, where the NR light assistance information is configured to enable a network element to determine a target cell to hand over a first communication node to the target cell or to page the first communication node in the target cell; and the second network element and the first network element belong to the same second communication node.

In an embodiment, the NR light assistance information includes support information of a cell for the first communication node.

The support information for the first communication node includes at least one of the following: whether the cell supports a RedCAP UE, whether the cell supports a Red-CAP UE of one receiving branch, or whether the cell supports a RedCAP UE of two receiving branches.

In an embodiment, sending the NR light assistance information to the first network element includes one of the following.

In a process of establishing a first interface between the first network element and the second network element, a first interface establishment request message is sent to the first network element, where the first interface establishment request message includes the NR light assistance information of a cell configured by the second network element.

After the first interface is established, a second network element configuration update request message is sent to the first network element, where the second network element configuration update request message includes the NR light assistance information of the cell configured by the second network element.

In an embodiment, the communication method applied to the second network element further includes the following.

A paging message initiated by the first network element is received on the first interface, where the paging message carries at least one of the following: an eDRX cycle or a PTW.

In an embodiment, the case where the first network element is a gNB-CU, the second network element is a gNB-DU, the first communication node is a RedCAP UE, the gNB-CU and the gNB-DU belong to the same base station (gNB), the first interface is the F1 interface, and the second interface is the Xn interface is used as an example for describing the process of NR light assistance information interaction between the base stations. FIG. 3 is a schematic diagram illustrating the interaction of NR light assistance information between base stations according to an embodiment of the present application. As shown in FIG. 3, the process of NR light assistance information interaction between the base stations in this embodiment includes S310 to S340.

In S310, an F1 interface establishment request message or a DU configuration update request message sent by the gNB-DU is received.

In an embodiment, in a process of establishing the F1 interface between the gNB-CU and the gNB-DU, the gNB-CU receives the F1 interface establishment request message sent by the gNB-DU, where the F1 interface establishment request message includes the NR light assistance information of the cell configured by the gNB-DU; or after the F1 interface is established, the gNB-CU receives the DU configuration update request message sent by the gNB-DU, where the DU configuration update request message includes the NR light assistance information of the cell configured by the DU.

The NR light assistance information includes support information of the cell for the RedCAP UE. The support information of the cell for the RedCAP UE includes at least one of the following: whether the cell supports the access of the RedCAP UE, whether the cell supports the RedCAP UE of one receiving branch (the 1Rx RedCAP UE), or whether the cell supports the RedCAP UE of two receiving branches (the 2Rx RedCAP UE).

In S320, an F1 interface establishment response or a DU configuration update response is sent to the gNB-DU.

In an embodiment, after the gNB-CU receives the F1 interface establishment request message or the DU configuration update request message sent by the gNB-DU, the gNB-CU saves the received NR light assistance information of the cell configured by the gNB-DU. At the same time, the gNB-CU sends the F1 interface establishment response or the DU configuration update response to the gNB-DU.

In S330, an Xn interface establishment request message or an RAN node configuration update request message sent by other base stations is received.

In an embodiment, in a process of establishing the Xn interface between multiple base stations, the gNB-CU receives the Xn interface establishment request message sent by other base stations, where the Xn interface establishment request message includes the NR light assistance information of the cell configured by the base station; or after the Xn interface is established, the gNB-CU receives the RAN node configuration update request message sent by other base stations, where the RAN node configuration update request message includes the NR light assistance information of the cell configured by the base station.

In S340, an RAN node configuration update feedback message is sent to other base stations.

The RAN node configuration update feedback message includes the NR light assistance information of the cell configured by one or more DUs of a base station where the gNB-CU is located.

Figure 4:
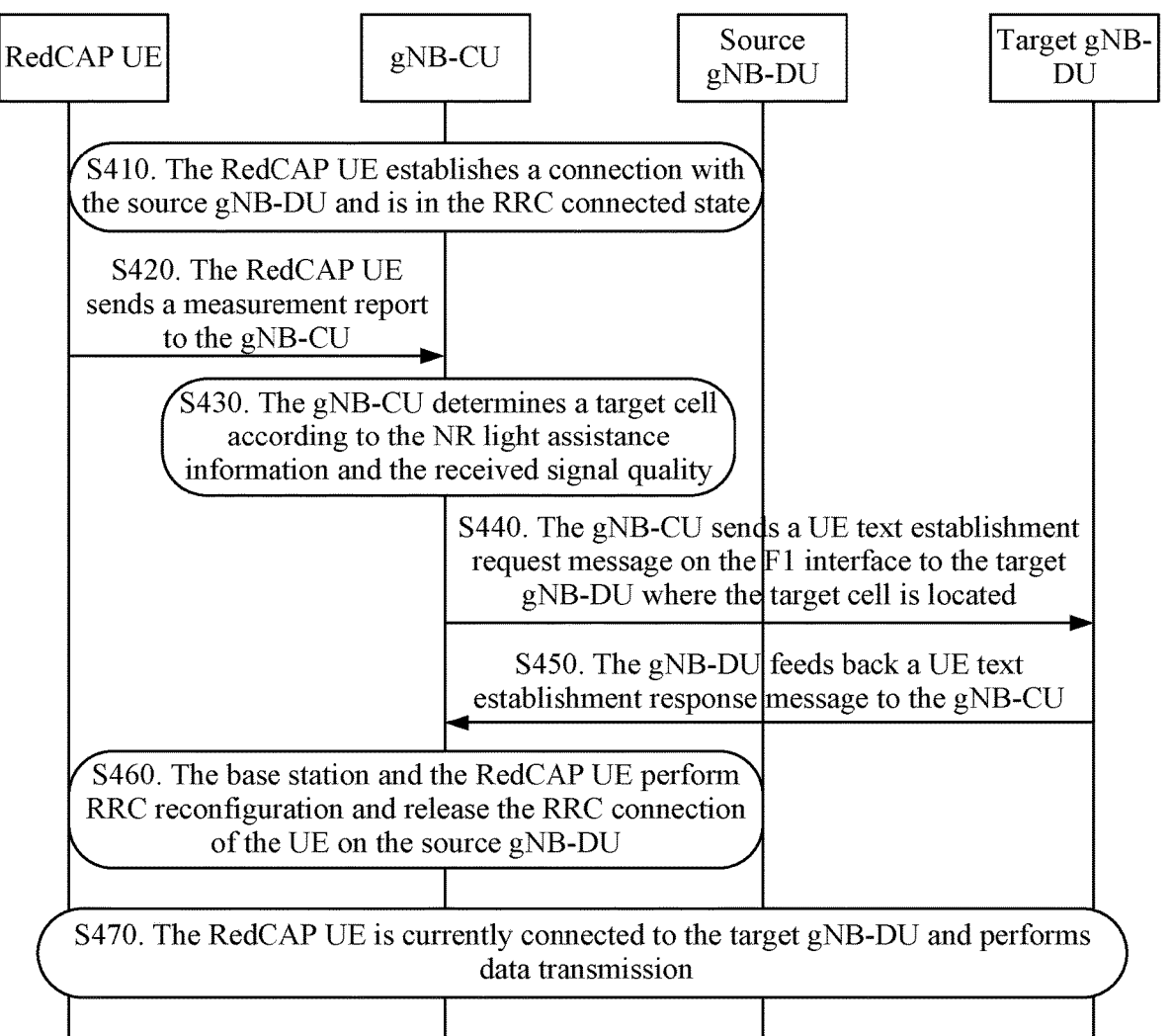
FIG. 4 is a schematic diagram illustrating the interaction of next-generation Node B-distributed unit (gNB-DU) handover based on NR light assistance information according to an embodiment of the present application.

In an embodiment, the case where the first network element is a gNB-CU, the second network element includes a source gNB-DU and a target gNB-DU, the first communication node is the RedCAP UE, the gNB-CU and the source gNB-DU belong to the same base station (gNB), the first interface is the F1 interface, and the second interface is the Xn interface is used as an example for describing a handover process between gNB-DUs according to the NR light assistance information. FIG. 4 is a schematic diagram illustrating the interaction of gNB-DU handover based on NR light assistance information according to an embodiment of the present application. As shown in FIG. 4, the interaction process of gNB-DU handover according to the NR light assistance information in this embodiment includes S410 to S470.

In S410, the RedCAP UE establishes a connection with the source gNB-DU and is in the RRC connected state.

In S420, the RedCAP UE sends a measurement report to the gNB-CU.

The measurement report includes received signal quality of one or more neighbour cells.

In S430, the gNB-CU determines a target cell according to the NR light assistance information and the received signal quality.

In an embodiment, the gNB-CU selects the target cell that supports the corresponding RedCAP UE according to the saved NR light information of the cell configured by multiple gNB-DUs of this base station and the received signal quality of one or more neighbour cells in the measurement report.

In S440, the gNB-CU sends a UE text establishment request message on the F1 interface to the target gNB-DU where the target cell is located.

The UE text establishment request message carries at least one of the following: the information indicating whether the first communication node is the RedCAP UE or the type of the first communication node (that is, whether the first communication node is the RedCAP UE of one receiving branch or the RedCAP UE of two receiving branches).

In S450, the gNB-DU feeds back a UE text establishment response message to the gNB-CU.

In an embodiment, the gNB-DU establishes a UE text on the target cell and feeds back the UE text establishment response message to the gNB-CU. If the UE text establishment request message carries the information indicating whether the first communication node is the RedCAP UE and/or the type of the first communication node, the gNB-DU determines whether the target cell supports the corresponding RedCAP UE. If the target cell does not support the corresponding RedCAP UE, a text establishment request rejection is fed back in the UE text establishment response message.

In S460, the base station and the RedCAP UE perform RRC reconfiguration and release the RRC connection of the UE on the source gNB-DU.

In S470, the RedCAP UE is currently connected to the target gNB-DU and performs data transmission.

In an embodiment, the case where the first network element is a gNB-CU, the second network element is a gNB-DU, the first communication node is a RedCAP UE, the gNB-CU and the gNB-DU belong to the source base station (gNB), the first interface is the F1 interface, and the second interface is the Xn interface is used as an example for describing a handover process between the base stations according to the NR-light assistance information. FIG. 5 is a schematic diagram illustrating the interaction of a base station handover based on NR light assistance information according to an embodiment of the present application. As shown in FIG. 5, the interaction process of the base station handover according to the NR light assistance information in this embodiment includes S510 to S570.

In S510, the RedCAP UE establishes a connection with the source gNB and is in the RRC connected state.

In S520, the RedCAP UE sends a measurement report to the source gNB.

The measurement report includes received signal quality of one or more neighbour cells.

In S530, the gNB-CU determines a target cell according to the NR light assistance information and the received signal quality.

In an embodiment, the gNB-CU in the source gNB selects the target cell that supports the corresponding RedCAP UE according to the saved NR light information of the cell configured by other base stations and the received signal quality of one or more neighbour cells in the measurement report.

In S540, the gNB-CU sends a handover request message on the Xn interface to the target gNB where the target cell is located.

In an embodiment, the handover request message carries at least one of the following: the information indicating whether the first communication node is the RedCAP UE or the type of the first communication node (that is, whether the first communication node is the RedCAP UE of one receiving branch or the RedCAP UE of two receiving branches).

In S550, the target gNB feeds back a handover response message to the source gNB.

In an embodiment, the target gNB establishes a UE text on the target cell and feeds back the handover response message to the source gNB. If the handover request message carries the information indicating whether the first communication node is the RedCAP UE and/or the type of the first communication node, the target base station determines whether the target cell supports the corresponding RedCAP UE. If the target cell does not support the corresponding RedCAP UE, a handover request rejection is fed back in the response message.

In S560, the source gNB and the UE perform RRC reconfiguration and release the RRC connection of the UE on the source gNB.

In S570, the RedCAP UE is currently connected to the target gNB and performs data transmission.

Figure 6:
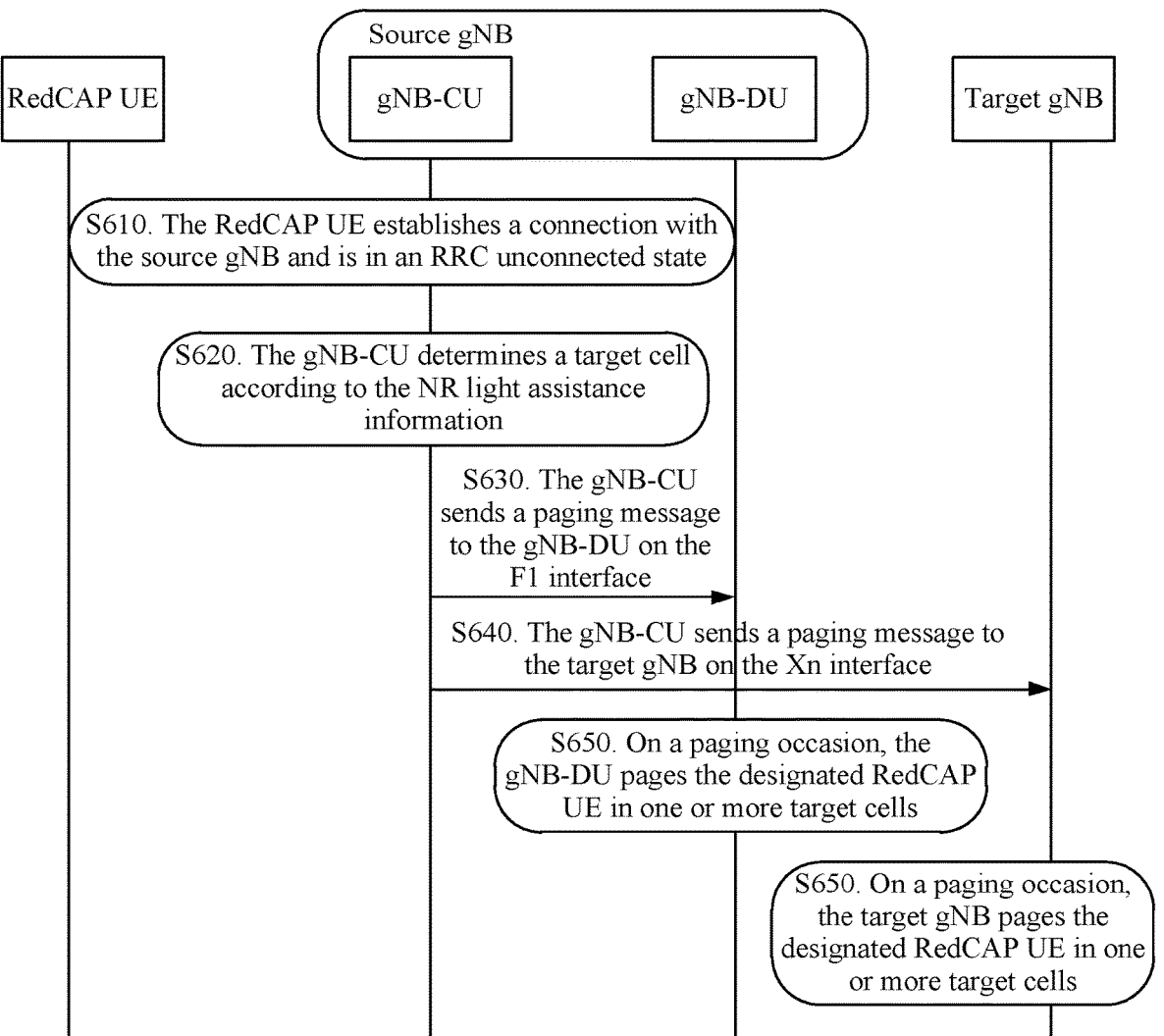
FIG. 6 is a schematic diagram illustrating the interaction of paging a RedCAP UE according to NR light assistance information according to an embodiment of the present application.

In an embodiment, the case where the first network element is a gNB-CU, the second network element is a gNB-DU, the first communication node is a RedCAP UE, the gNB-CU and the gNB-DU belong to the source base station (gNB), the first interface is the F1 interface, and the second interface is the Xn interface is used as an example for describing the process of paging the RedCAP UE according to the NR light assistance information. FIG. 6 is a schematic diagram illustrating the interaction of paging the RedCAP UE based on NR light assistance information according to an embodiment of the present application. As shown in FIG. 6, the interaction process of paging the RedCAP UE according to the NR light assistance information in this embodiment includes S610 to S650.

In S610, the RedCAP UE establishes a connection with the source gNB and is in an RRC unconnected state.

The RedCAP UE is in the RRC unconnected state, which may be understood as the RedCAP UE is in the RRC idle state or the RRC inactive state.

In S620, the gNB-CU determines a target cell according to the NR light assistance information.

In an embodiment, the gNB-CU in the source gNB selects one or more target cells that support the corresponding RedCAP UE according to the save NR light assistance information of the cell configured by multiple gNB-DUs in this base station; and the gNB-CU of the source gNB selects one or more target cells that support the corresponding RedCAP UE according to the saved NR light assistance information of the cell configured by other base stations.

In S630, the gNB-CU sends a paging message on the F1 interface to the gNB-DU.

In an embodiment, the paging message carries at least one of the following: an eDRX cycle or a PTW.

In S640, the gNB-CU sends a paging message on the Xn interface to the target gNB.

In an embodiment, the paging message carries at least one of the following: an eDRX cycle or a PTW.

In S650, on a paging occasion, the gNB-DU or the target gNB pages the designated RedCAP UE in one or more target cells.

In an embodiment, the gNB-DU or the target gNB calculates the paging occasion according to the one or more target cells in the paging message, the eDRX cycle and the PTW, and the gNB-DU or the target gNB pages the designated RedCAP UE in the one or more target cells on the paging occasion.

Figure 7:
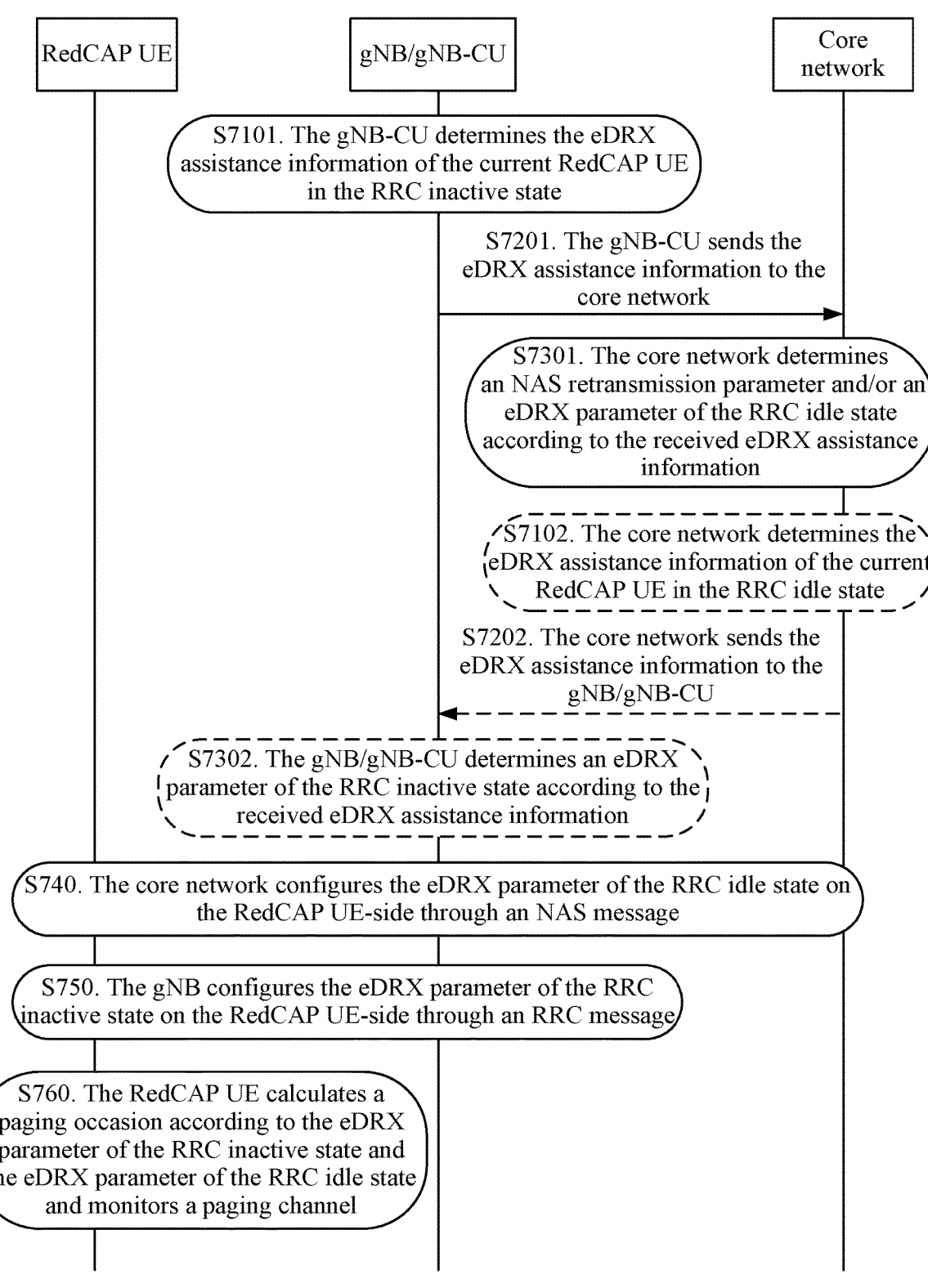
FIG. 7 is a schematic diagram illustrating the configuration of a RedCAP UE paging parameter according to an embodiment of the present application.

In an embodiment, the case where the first network element is a gNB-CU, the second network element is a gNB-DU, the first communication node is the RedCAP UE, and the gNB-CU and the gNB-DU belong to the same base station (gNB) is used as an example for describing a process of configuring a RedCAP UE paging parameter. FIG. 7 is a schematic diagram illustrating the configuration of a RedCAP UE paging parameter according to an embodiment of the present application. As shown in FIG. 7, the process of configuring the RedCAP UE paging parameter in this embodiment includes the following.

In S7101, the gNB-CU determines eDRX assistance information of the current RedCAP UE in the RRC inactive state.

In an embodiment, the gNB-CU determines the eDRX assistance information of the current RedCAP UE in the RRC inactive state, where the eDRX assistance information of the RRC inactive state includes the eDRX cycle of the RRC inactive state and/or the PTW of the RRC inactive state.

In S7201, the gNB-CU sends the eDRX assistance information to the core network.

The eDRX assistance information includes at least one of the following: the eDRX cycle of the RRC inactive state or the PTW of the RRC inactive state.

In S7301, the core network determines a non-access stratum (NAS) retransmission parameter and/or an eDRX parameter of the RRC idle state according to the received eDRX assistance information.

The NAS retransmission parameter includes one of the following: the number of NAS message retransmissions or an NAS message retransmission timer. For example, the core network determines an appropriate eDRX cycle of the idle state according to the received eDRX cycle of the inactive state and the PTW of the RRC inactive state so that the DRX cycle of the RRC idle state is longer than the DRX cycle of the RRC inactive state; or the PTW length of the RRC idle state is greater than the PTW of the RRC inactive state; or the total maximum retransmission time determined by the number of NAS message retransmissions and the NAS message retransmission timer is greater than the eDRX cycle of the inactive state.

In S7102, the core network determines the eDRX assistance information of the current RedCAP UE in the RRC idle state.

In an embodiment, the core network determines the eDRX assistance information of the current RedCAP UE in the RRC idle state, and the eDRX assistance information of the RRC idle state includes the eDRX cycle of the RRC idle state and/or the PTW of the RRC idle state.

In S7202, the core network sends the eDRX assistance information to the gNB/gNB-CU.

The eDRX assistance information includes at least one of the following: the maximum DRX cycle allowed by the eDRX of the inactive state, the minimum DRX cycle allowed by the eDRX of the inactive state, the DRX cycle range allowed by the eDRX of the inactive state, the maximum PTW length allowed by the eDRX of the inactive state, the minimum PTW length allowed by the eDRX of the inactive state, or the PTW length range allowed by the eDRX of the inactive state.

In S7302, the gNB/gNB-CU determines an eDRX parameter of the RRC inactive state according to the received eDRX assistance information.

In S740, the core network configures the eDRX parameter of the RRC idle state on the RedCAP UE-side through an NAS message.

In S750, the gNB configures the eDRX parameter of the RRC inactive state on the RedCAP UE-side through an RRC message.

In S760, the RedCAP UE calculates a paging occasion according to the eDRX parameter of the RRC inactive state and the eDRX parameter of the RRC idle state, and monitors a paging channel.

S7101 to S7301 and S7102 to S7302 are two parallel schemes, that is, when S7101 to S7301 are executed, S7102 to S7302 cannot be executed; correspondingly, when S7102 to S7302 are executed, S7101 to S7301 cannot be executed.

Figure 8:
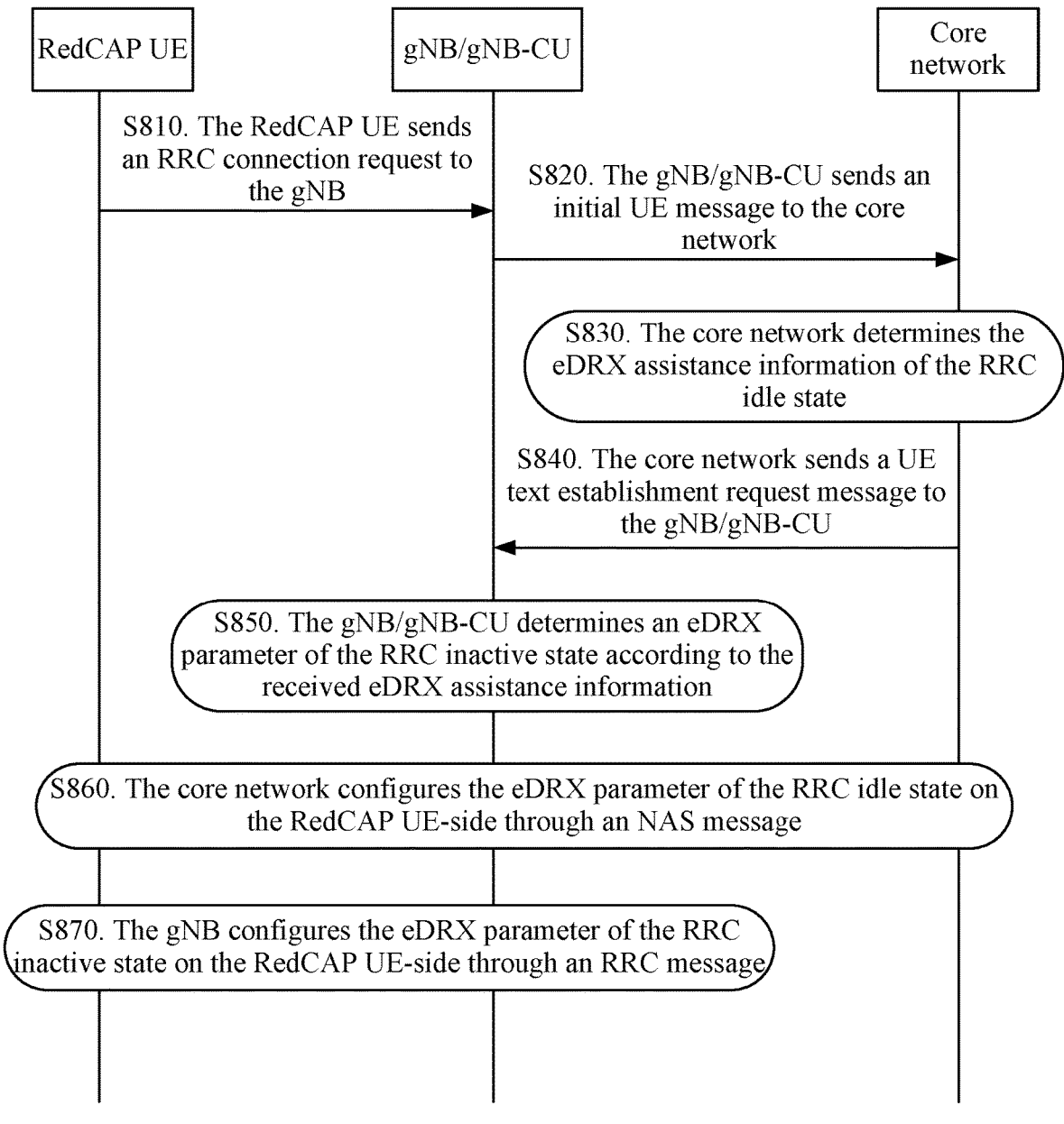
FIG. 8 is a schematic diagram illustrating the configuration of accessing and returning extended discontinuous reception (eDRX) assistance information based on the type of a RedCAP UE according to an embodiment of the present application.

In an embodiment, the case where the first network element is a gNB-CU, the second network element is a gNB-DU, the first communication node is a RedCAP UE, and the gNB-CU and the gNB-DU belong to the same base station (gNB) is used as an example for describing a process of accessing and returning the eDRX assistance information according to the type of the RedCAP UE. FIG. 8 is a schematic diagram illustrating the configuration of accessing and returning eDRX assistance information based on the type of the RedCAP UE according to an embodiment of the present application. As shown in FIG. 8, the interaction process of accessing and returning the eDRX assistance information according to the type of the RedCAP UE in this embodiment includes S810 to S860.

In S810, the RedCAP UE sends an RRC connection request to the gNB.

In S820, the gNB/gNB-CU sends an initial UE message to the core network.

In an embodiment, the initial UE message is used for access. The initial UE message includes information indicating whether the first communication node is the RedCAP UE and/or the type of the first communication node (that is, whether the first communication node is the RedCAP UE of one receiving branch or the RedCAP UE of two receiving branches).

In S830, the core network determines the eDRX assistance information of the RRC idle state.

In S840, the core network sends a UE text establishment request message to the gNB/gNB-CU.

In an embodiment, the UE text establishment request message includes the eDRX assistance information, where the eDRX assistance information includes at least one of the following: the maximum DRX cycle allowed by the eDRX of the inactive state, the minimum DRX cycle allowed by the eDRX of the inactive state, the DRX cycle range allowed by the eDRX of the inactive state, the maximum PTW length allowed by the eDRX of the inactive state, the minimum PTW length allowed by the eDRX of the inactive state, or the PTW length range allowed by the eDRX of the inactive state.

In S850, the gNB/gNB-CU determines an eDRX parameter of the RRC inactive state according to the received eDRX assistance information.

In S860, the core network configures the eDRX parameter of the RRC idle state on the RedCAP UE-side through an NAS message.

In S870, the gNB configures the eDRX parameter of the RRC inactive state on the RedCAP UE-side through an RRC message.

Figure 9:
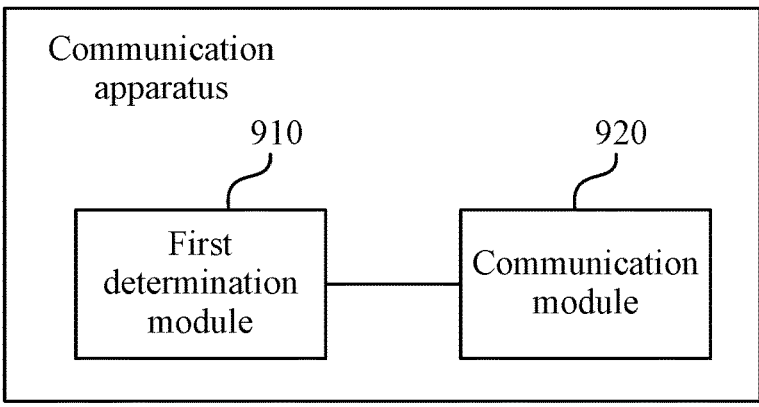
FIG. 9 is a block diagram of a communication apparatus according to an embodiment of the present application.

In an embodiment, FIG. 9 is a block diagram of a communication apparatus according to an embodiment of the present application. This embodiment is applied to a first network element. As shown in FIG. 9, this embodiment includes a first determination module 910 and a communication module 920.

The first determination module 910 is configured to determine a target cell according to received NR light assistance information.

The communication module 920 is configured to hand a first communication node over to the target cell or page the first communication node in the target cell.

In an embodiment, the communication apparatus applied to a first network element further includes a first receiver.

The first receiver is configured to, before the target cell is determined according to the received NR light assistance information, receive the NR light assistance information sent by a second network element. The second network element and the first network element belong to the same second communication node.

Alternatively, the first receiver is configured to, before the target cell is determined according to the received NR light assistance information, receive the NR light assistance information sent by a third communication node. The second communication node and the third communication node belong to the same type of node.

Alternatively, the first receiver is configured to, before the target cell is determined according to the received NR light assistance information, receive the NR light assistance information sent by the second network element and the third communication node.

In an embodiment, the NR light assistance information includes support information of a cell for the first communication node.

The support information for the first communication node includes at least one of the following: whether the cell supports the access of a RedCAP UE, whether the cell supports a RedCAP UE of one receiving branch, or whether the cell supports a RedCAP UE of two receiving branches.

In an embodiment, receiving the NR light assistance information sent by the second network element is used for the following.

In the process of establishing a first interface between the first network element and the second network element, a first interface establishment request message sent by the second network element is received, where the first interface establishment request message includes the NR light assistance information of a cell configured by the second network element.

After the first interface is established, a second network element configuration update request message sent by the second network element is received, where the second network element configuration update request message includes the NR light assistance information of the cell configured by the second network element.

In an embodiment, receiving the NR light assistance information sent by the third communication node is used for the following.

In the process of establishing a second interface between the second communication node and the third communication node, a second interface establishment request message sent by the third communication node is received, where the second interface establishment request message includes the NR light assistance information of a cell configured by the second communication node.

After the second interface is established, an RAN node configuration update request message sent by the third communication node is received, where the RAN node configuration update request message includes the NR light assistance information of the cell configured by the second communication node.

In an embodiment, the first determination module is configured to, for the first communication node currently in an RRC connected state, determine the target cell on a second network element according to the received NR light assistance information.

In an embodiment, the first determination module is configured to, for the first communication node currently in an RRC connected state, determine the target cell on a third communication node according to the received NR light assistance information.

In an embodiment, the communication apparatus applied to the first network element further includes a first initiation module.

The first initiation module is configured to, after the target cell is determined according to the received NR light assistance information, initiate a UE text establishment request to the target cell on a first interface, where the UE text establishment request carries at least one of the following: the information indicating whether the first communication node is a RedCAP UE or the type of the first communication node.

In an embodiment, the communication apparatus applied to the first network element further includes a second initiation module.

The second initiation module is configured to, after the target cell is determined according to the received NR light assistance information, initiate a handover request to the target cell on a second interface, where the handover request carries at least one of the following: the information indicating whether the first communication node is the RedCAP UE or the type of the first communication node.

In an embodiment, the first determination module is configured to, for the first communication node currently in an RRC inactive state, determine the target cell on a second network element according to the received NR light assistance information.

In an embodiment, the first determination module is configured to, for the first communication node currently in an RRC inactive state, determine the target cell on a third communication node according to the received NR light assistance information.

In an embodiment, the communication apparatus applied to the first network element further includes a third initiation module.

The third initiation module is configured to, after the target cell on the second network element is determined, initiate a paging message to the second network element on a first interface, where the paging message carries at least one of the following: an eDRX cycle or a PTW.

In an embodiment, the communication apparatus applied to the first network element further includes a second transmitter.

The second transmitter is configured to send eDRX assistance information to a core network, where the eDRX assistance information includes at least one of the following: an eDRX cycle of an RRC inactive state or a PTW of the RRC inactive state.

In an embodiment, the communication apparatus applied to the first network element further includes a second receiver and a second determination module.

The second receiver is configured to receive the eDRX assistance information sent by a core network, where the eDRX assistance information includes at least one of the following: the maximum DRX cycle allowed by eDRX of an inactive state, the minimum DRX cycle allowed by the eDRX of the inactive state, a DRX cycle range allowed by the eDRX of the inactive state, the maximum PTW length allowed by the eDRX of the inactive state, the minimum PTW length allowed by the eDRX of the inactive state, or a PTW length range allowed by the eDRX of the inactive state.

The second determination module is configured to determine an eDRX parameter of the RRC inactive state according to the eDRX assistance information.

In an embodiment, the communication apparatus applied to the first network element further includes a third transmitter.

The third transmitter is configured to send an initial UE message to a core network, where the initial UE message carries at least one of the following: the information indicating whether the first communication node is the RedCAP UE or the type of the first communication node.

The communication apparatus provided in this embodiment is configured to perform the communication method applied to the first network element in the embodiment shown in FIG. 1 and has similar implementation principles and technical effects, which are not repeated here.

Figure 10:
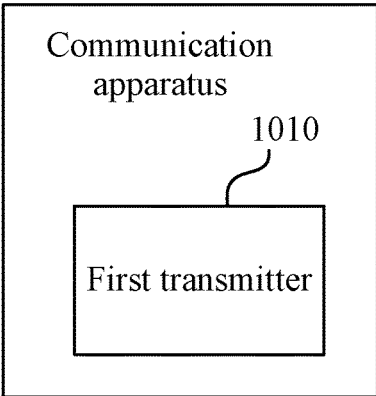
FIG. 10 is a block diagram of another communication apparatus according to an embodiment of the present application.

In an embodiment, FIG. 10 is a block diagram of another communication apparatus according to an embodiment of the present application. This embodiment is applied to a second network element. As shown in FIG. 10, this embodiment includes a first transmitter 1010.

The first transmitter 1010 is configured to send NR light assistance information to a first network element, where the NR light assistance information is configured to enable a network element to determine a target cell to hand a first communication node over to the target cell or to page the first communication node in the target cell; and the second network element and the first network element belong to the same second communication node.

In an embodiment, the NR light assistance information includes support information of a cell for the first communication node.

The support information for the first communication node includes at least one of the following: whether the cell supports the RedCAP UE, whether the cell supports a RedCAP UE of one receiving branch, or whether the cell supports a RedCAP UE of two receiving branches.

In an embodiment, the first transmitter 1010 is configured to perform at least one of the following.

In the process of establishing a first interface between the first network element and the second network element, a first interface establishment request message is sent to the first network element, where the first interface establishment request message includes the NR light assistance information of a cell configured by the second network element.

After the first interface is established, a second network element configuration update request message is sent to the first network element, where the second network element configuration update request message includes the NR light assistance information of the cell configured by the second network element.

In an embodiment, the communication apparatus applied to the second network element further includes a third receiver.

The third receiver is configured to receive a paging message initiated by the first network element on a first interface, where the paging message carries at least one of an eDRX cycle or a PTW.

The communication apparatus provided in this embodiment is configured to perform the communication method applied to the second network element in the embodiment shown in FIG. 2 and has similar implementation principles and technical effects, which are not repeated here.

Figure 11:
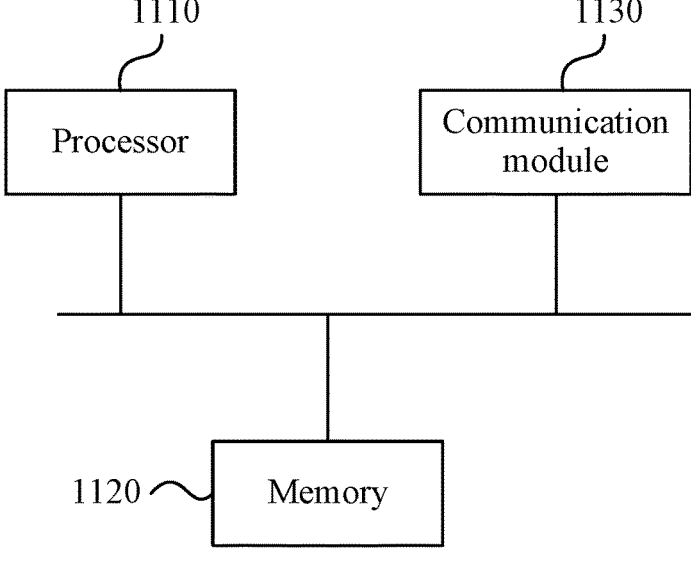
FIG. 11 is a structural diagram of a communication device according to an embodiment of the present application.

FIG. 11 is a structural diagram of a communication device according to an embodiment of the present application. As shown in FIG. 11, the device in the present application includes a processor 1110, a memory 1120, and a communication module 1130. One or more processors 1110 may be disposed in the device. FIG. 11 shows one processor 1110 as an example. One or more memories 1120 may be disposed in the device. FIG. 11 shows one memory 1120 as an example.

The processor 1110, the memory 1120, and the communication module 1130 in the device may be connected via a bus or in other manners. The connection via the bus is shown as an example in FIG. 11. In this embodiment, the device may be a first network element (for example, a CU).

As a computer-readable storage medium, the memory 1120 may be configured to store software programs and computer-executable programs and modules, such as program instructions/modules (for example, the first determination module 910 and the communication module 920 in the communication apparatus) corresponding to the device according to any embodiment of the present application. The memory 1120 may include a program storage region and a data storage region. The program storage region may store an operating system and an application program required by at least one function. The data storage region may store data created according to the use of the device. Additionally, the memory 1120 may include a high-speed random-access memory and may also include a nonvolatile memory such as at least one disk memory, a flash memory, or another nonvolatile solid-state memory. In some examples, the memory 1120 may further include memories located remotely relative to the processor 1110 and these remote memories may be connected to the device via the network. Examples of the preceding network include, but are not limited to, the Internet, an intranet, a local area network, a mobile communication network, and a combination thereof.

The communication module 1130 is configured to perform the communication interaction between a first network element, a second network element, a first communication node, a second communication node, a third communication node, and a core network.

In a case where the communication device is the first network element, the device provided above may be configured to perform the communication method applied to the first network element provided by any preceding embodiment and has corresponding functions and effects.

In a case where the communication device is the second network element, the device provided above may be configured to perform the communication method applied to the second network element provided by any preceding embodiment and has corresponding functions and effects.

An embodiment of the present application further provides a storage medium including computer-executable instructions, and when executed by a computer processor, the computer-executable instructions are used for performing a communication method applied to the first network element. The method includes determining a target cell according to received NR light assistance information; and handing a first communication node over to the target cell or paging the first communication node in the target cell.

An embodiment of the present application further provides a storage medium including computer-executable instructions, and when executed by a computer processor, the computer-executable instructions are used for performing a communication method applied to a second network element. The method includes sending NR light assistance information to a first network element; the NR light assistance information is used for enabling a network element to determine a target cell to hand a first communication node over to the target cell or to page the first communication node in the target cell; and the second network element and the first network element belong to the same second communication node.

It is to be understood by those skilled in the art that the term user equipment covers any suitable type of wireless user equipment, for example, a mobile phone, a portable data processing device, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), and an optical memory apparatus and system (a digital video disc (DVD) or a compact disk (CD)). Computer-readable media may include non-transitory storage media. The data processor may be of any type suitable for the local technical environment, for example, but not limited to, a general-purpose computer, a special-purpose computer, a microprocessor, a digital signal processor (DSP), an application specific integrated circuit (ASIC), a field-programmable gate array (FGPA), and a processor based on a multi-core processor architecture.

The above are merely several embodiments of the present application and are not intended to limit the present application, and for those skilled in the art, the present application may have various modifications and variations. Any modifications, equivalent substitutions, improvements, and the like made within the spirit and principle of the present application should fall within the scope of the present application.

What is claimed is:

1. A communication method, being applied to a central unit (CU) and comprising:

determining a target cell according to received cell-related new radio (NR) light assistance information; and handing over a reduced capability (RedCAP) user equipment (UE) to the target cell or paging a RedCAP UE in the target cell;

wherein before determining the target cell according to the received cell-related NR light assistance information, the method further comprises one of the following:

receiving the cell-related NR light assistance information sent by a distributed unit (DU), wherein the DU and the CU belong to a same base station;

receiving the cell-related NR light assistance information sent by a third communication node, wherein the third communication node is a base station, and the CU belongs to a base station different from the third communication node; or receiving the cell-related NR light assistance information sent by a DU and a third communication node.

2. The method of claim 1, wherein the cell-related NR light assistance information comprises support information of a cell for the RedCAP UE;

wherein the support information for the RedCAP UE comprises at least one of the following: whether the cell supports access of the RedCAP UE, whether the cell supports the RedCAP UE of one receiving branch, or whether the cell supports the RedCAP UE of two receiving branches.

3. The method of claim 1, wherein receiving the cell-related NR light assistance information sent by the DU comprises one of the following:

in a process of establishing a first interface between the CU and the DU, receiving a first interface establishment request message sent by the DU, wherein the first interface establishment request message comprises the cell-related NR light assistance information of a cell configured by the DU; or after a first interface is established, receiving a DU configuration update request message sent by the DU, wherein the DU configuration update request message comprises the cell-related NR light assistance information of a cell configured by the DU.

4. The method of claim 1, wherein receiving the cell-related NR light assistance information sent by the third communication node comprises one of the following:

in a process of establishing a second interface between the base station to which the CU belongs and the third communication node, receiving a second interface establishment request message sent by the third communication node, wherein the second interface establishment request message comprises the cell-related NR light assistance information of a cell configured by the third communication node; or after a second interface is established, receiving a radio access network (RAN) node configuration update request message sent by the third communication node, wherein the RAN node configuration update request message comprises the cell-related NR light assistance information of a cell configured by the third communication node.

5. The method of claim 1, wherein determining the target cell according to the received cell-related NR light assistance information comprises one of the following:

determining, for the RedCAP UE currently in a radio resource control (RRC) connected state, the target cell on the DU according to the received cell-related NR light assistance information; or determining, for the RedCAP UE currently in an RRC connected state, the target cell on the third communication node according to the received cell-related NR light assistance information.

6. The method of claim 1, wherein after determining the target cell according to the received cell-related NR light assistance information, the method further comprises:

initiating, on a first interface, a UE text establishment request to the target cell, wherein the UE text establishment request carries a type of the RedCAP UE.

7. The method of claim 1, wherein after determining the target cell according to the received cell-related NR light assistance information, the method further comprises:

initiating, on a second interface, a handover request to the target cell, wherein the handover request carries a type of the RedCAP UE.

8. The method of claim 1, wherein determining the target cell according to the received cell-related NR light assistance information comprises:

determining, for the RedCAP UE currently in an RRC inactive state, the target cell on the DU according to the received cell-related NR light assistance information.

9. The method of claim 1, wherein determining the target cell according to the received cell-related NR light assistance information comprises:

determining, for the RedCAP UE currently in an RRC inactive state, the target cell on the third communication node according to the received cell-related NR light assistance information.

10. The method of claim 8, wherein after determining the target cell on the DU, the method further comprises:

initiating a paging message to the DU on a first interface, or initiating a paging message to the third communication node on a second interface, wherein the paging message carries at least one of the following: an extended discontinuous reception (eDRX) cycle or a paging time window (PTW).

11. The method of claim 1, further comprising:

sending eDRX assistance information to a core network, wherein the eDRX assistance information comprises at least one of the following: an eDRX cycle of an RRC inactive state or a PTW of an RRC inactive state.

12. The method of claim 1, further comprising:

receiving eDRX assistance information sent by a core network, wherein the eDRX assistance information comprises at least one of the following: a maximum discontinuous reception (DRX) cycle allowed by eDRX of an inactive state, a minimum DRX cycle allowed by eDRX of an inactive state, a DRX cycle range allowed by eDRX of an inactive state, a maximum PTW length allowed by eDRX of an inactive state, a minimum PTW length allowed by eDRX of an inactive state, or a PTW length range allowed by eDRX of an inactive state; and determining an eDRX parameter of an RRC inactive state according to the eDRX assistance information.

13. The method of claim 1, further comprising:

sending an initial UE message to a core network, wherein the initial UE message carries a type of the RedCAP UE.

14. A communication method, being applied to a distributed unit (DU) and comprising:

sending cell-related new radio (NR) light assistance information to a central unit (CU), wherein the cell-related NR light assistance information is configured to enable the CU to determine a target cell to hand over a reduced capability (RedCAP) user equipment (UE) to the target cell or to page a RedCAP UE in the target cell, and the DU and the CU belong to a same base station.

15. The method of claim 14, wherein the cell-related NR light assistance information comprises support information of a cell for the RedCAP UE;

wherein the support information for the RedCAP UE comprises at least one of the following: whether the cell supports the RedCAP UE, whether the cell supports the RedCAP UE of one receiving branch, or whether the cell supports the RedCAP UE of two receiving branches.

16. The method of claim 14, wherein sending the cell-related NR light assistance information to the CU comprises one of the following:

in a process of establishing a first interface between the CU and the DU, sending a first interface establishment request message to the CU, wherein the first interface establishment request message comprises the cell-related NR light assistance information of a cell configured by the DU; or after a first interface is established, sending a DU configuration update request message to the CU, wherein the DU configuration update request message comprises the cell-related NR light assistance information of a cell configured by the DU.

17. The method of claim 14, further comprising:

receiving, on a first interface, a paging message initiated by the CU, wherein the paging message carries at least one of the following: an extended discontinuous reception (eDRX) cycle or a paging time window (PTW).

18. A base station, comprising a central unit (CU) and a distributed unit (DU), wherein the CU is configured to perform a communication interaction among the DU, a reduced capability (RedCAP) user equipment (UE), other stations, and a core network; and the CU is further configured to perform the following:

determining a target cell according to received cell-related new radio (NR) light assistance information; and handing over the RedCAP UE to the target cell or paging the RedCAP UE in the target cell;

wherein before determining the target cell according to the received cell-related NR light assistance information, the CU is further configured to perform one of the following:

receiving the cell-related NR light assistance information sent by the DU;

receiving the cell-related NR light assistance information sent by a third communication node, wherein the third communication node is a different base station; or receiving the cell-related NR light assistance information sent by the DU and a third communication node.

19. A non-transitory storage medium storing a computer program which, when executed by a processor, causes the processor to perform the method of claim 1.

20. The base station of claim 18, wherein the cell-related NR light assistance information comprises support information of a cell for the RedCAP UE;

wherein the support information for the RedCAP UE comprises at least one of the following: whether the cell supports access of the RedCAP UE, whether the cell supports the RedCAP UE of one receiving branch, or whether the cell supports the RedCAP UE of two receiving branches.

* * * * *